US009055058B2

(12) United States Patent
Lu et al.

(10) Patent No.: US 9,055,058 B2
(45) Date of Patent: Jun. 9, 2015

(54) METHOD AND APPARATUS FOR SERIAL DEVICE REGISTRATION (75) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 1 day.

(21) Appl. No.: 14/118,929

(22) PCT Filed: Jul. 30, 2012

(86) PCT No.: PCT/CN2012/079329
§ 371 (c)(1),
(2), (4) Date: Nov. 20, 2013

(87) PCT Pub. No.: WO2013/017058
PCT Pub. Date: Feb. 7, 2013

(65) Prior Publication Data
US 2014/0115339 A1 Apr. 24, 2014

(30) Foreign Application Priority Data
Jul. 29, 2011 (CN) .......................... 2011 1 0217277

(51) Int. Cl.
H04L 29/06 (2006.01)
G06F 21/73 (2013.01)
(Continued)

(52) U.S. Cl.
CPC ............ *H04L 63/0823* (2013.01); *G06F 21/73* (2013.01); *H04L 63/10* (2013.01); *H04L 9/0869* (2013.01); *H04L 9/3263* (2013.01);
(Continued)

(58) Field of Classification Search
CPC ..... G06F 21/44; G06F 21/73; H04L 63/0823; H04L 63/10; H04L 9/0869; H04L 9/3263; H04L 9/3271

USPC ......................................................... 713/176
See application file for complete search history.

(56) References Cited

U.S. PATENT DOCUMENTS 5,637,929 A * 6/1997 Treharne ...................... 307/10.5
5,790,014 A * 8/1998 Campbell et al. .......... 340/10.34
(Continued)

FOREIGN PATENT DOCUMENTS

| CN | 1953372 A | 4/2007 |
| CN | 101964709 A | 2/2011 |
| CN | 102231667 A | 11/2011 |

*Primary Examiner* — Michael S McNally
(74) *Attorney, Agent, or Firm* — Hammer & Associates, P.C.

(57) ABSTRACT

Disclosed in the present invention are a method and apparatus for serial device registration. Said method comprises: a first serial device establishes connection with a second serial device; the first serial device reports the device attribute information of the first serial device to the second serial device, so as to initiate the process of registering the first serial device in the second device; in the registration process, after receiving the request of asking for signature certificate from the second serial device, the first serial device sends a first signature certificate to the second serial device; computing the received first challenge code returned from the second serial device, and obtaining a first signature value; sending the first signature value to the second serial device, so as to authenticate the first signature value by the second serial device and return the authentication result to the first serial device; after the authentication, the first serial device accomplishes the registration in the second serial device. The present invention solves the problem of lacking security authentication mechanism at the time of registering, thus improving communication security.

8 Claims, 4 Drawing Sheets (51) Int. Cl.
*H04L 9/32* (2006.01)
*G06F 21/44* (2013.01)
*H04L 9/08* (2006.01)

(52) U.S. Cl.
CPC .............. *H04L9/3271* (2013.01); *G06F 21/44* (2013.01); *G06F 2221/2103* (2013.01)

(56) References Cited

U.S. PATENT DOCUMENTS

| | | | |
|---|---|---|---|
| 2004/0187018 A1* | 9/2004 | Owen et al. | 713/200 |
| 2004/0254006 A1* | 12/2004 | Lam et al. | 463/16 |
| 2004/0254013 A1* | 12/2004 | Quraishi et al. | 463/29 |
| 2004/0254014 A1* | 12/2004 | Quraishi et al. | 463/29 |
| 2005/0033959 A1* | 2/2005 | Zheng et al. | 713/169 |
| 2005/0188200 A1* | 8/2005 | Kwok | 713/168 |
| 2005/0248966 A1* | 11/2005 | Matsui | 363/55 |
| 2007/0014397 A1* | 1/2007 | Ukeda et al. | 380/30 |
| 2008/0046739 A1* | 2/2008 | Adams et al. | 713/176 |
| 2008/0046751 A1* | 2/2008 | Choi | 713/185 |
| 2008/0059797 A1* | 3/2008 | Tokuno et al. | 713/171 |
| 2008/0072048 A1* | 3/2008 | Brown et al. | 713/173 |
| 2009/0106548 A1 | 4/2009 | Arditti et al. | |

* cited by examiner

METHOD AND APPARATUS FOR SERIAL DEVICE REGISTRATION

TECHNICAL FIELD

The present invention relates to information security field, and more particularly to a method for serial device registration and an apparatus therefor.

PRIOR ART

With development of the communication network technology, security and confidentiality of data information become more important. More and more personal information and commercial information is stored in a serial device; at the same time, some serial devices need communicate with other serial devices by wireless communication. For generation of those applications, how to protect registration among serial devices effectively and assure security of information of users and system becomes an urgent problem to be solved.

For the problem that the serial device in the prior art lacks secure authentication mechanism at the time of registration, no effective solution has been provided at present.

SUMMARY OF THE INVENTION

The object of the present invention is to provide a method for serial device registration and an apparatus therefor so as to solve the problem of lacking secure authentication mechanism for registration of the above serial device.

According to one aspect of the present invention, there is provided a method for registering a serial device which comprises steps of a first serial device establishing connection to a second serial device; the first serial device reporting device attribute information of the first serial device to the second serial device and thus initiating a process of registering the first serial device in the second serial device; in the process of registering, the first serial device sending a first signature certificate after the first serial device receives a request of asking for signature certificate by the second serial device; the first serial device receiving a first challenge code returned by the second serial device and computing the challenge code to obtain a first signature value; the first serial device sending the first signature value to the second serial device and thus the second serial device authenticating the first signature value according to the first signature certificate and returning an authentication result to the first serial device; and after the first serial device passing authentication successfully, the first serial device accomplishing registering in the second serial device.

Preferably, the first serial device establishing connection to the second serial device comprises after the first serial device is inserted into the second serial device, the first serial device sending a detecting character and a request of setting device attribute information to the second serial device with a first baud rate; if the first serial device does not receive a response returned from the second serial device, the first serial device adjusting the first baud rate and resending the detecting character to the second serial device with the adjusted first baud rate.

Preferably, the first serial device reporting device attribute information of the first serial device to the second serial device comprises the first serial device receiving the response and determining whether the response is permitting to set device attribute information; if yes, the first serial device reporting the device attribute information of the first serial device to the second serial device; if no, the first serial device sending a command of identifying device type to the second serial device; and, after receiving a request command of asking for the device attribute information by the second serial device, the first serial device reporting the device attribute information of the first serial device to the second serial device according to the request command.

Preferably, if the response is permitting to set device attribute information, the first serial device reporting the device attribute information to the second serial device is implemented by setting the following device attribute commands: a command of setting device identifier ID, a command of setting device capability, a command of setting device information and a command of setting device protocol character string; wherein the command of setting device information comprises a command of setting device name, a command of setting device software version, a command of setting device hardware version, a command of setting device manufacturer name, a command of setting device type, and a command of setting device radio frequency authentication.

Preferably, the command of setting device attribute further comprises a command of setting device sequence number and/or a command of setting device applied character string.

Preferably, if the response is not permitting to set device attribute information, the first serial device reporting device attribute information according to the request command comprises the device name, the device software version attribute information, the device hardware version attribute information, the device manufacturer name attribute information, and the device type attribute information of the first serial device.

Preferably, the device attribute information further comprises device sequence number attribute information and/or maximum length of a data packet supported by the device of the first serial device.

Preferably, the method further comprises the first serial device authenticating the second serial device, wherein the first serial device obtaining a second signature certificate from the second serial device;

the first serial device sending a second challenge code to the second serial device and thus the second serial device generating a second signature value according to the second challenge code and returning the second signature value to the first serial device; and the first serial device using the second signature certificate to authenticate the second signature value; and after passing authentication successfully, the first serial device sending information of successful authentication to the second serial device.

Preferably, if the authentication result of the first serial device or the second serial device is failed authentication, the method further comprises the first serial device re-reporting device attribute information to the second serial device and re-initiating registering process till successful authentication.

According to another aspect of the present invention, there is provided an apparatus for registering among serial devices, which is set on a first serial device, and the apparatus comprises: a connection establishing module configured to establish connection to a second serial device; a device attribute reporting module configured to report device attribute information of the first serial device to the second serial device so as to initiate process of registering the first serial device in the second serial device; an authenticating module configured to accept authentication by the first serial device in registration process; wherein the authenticating module comprises a certificate sending unit configured to send a first signature certificate to the second serial device after receiving a request of asking for signature certificate by the second serial device; a computing unit configured to receive a first challenge code returned by the second serial device and compute the first challenge code to obtain a first signature value; a signature value sending unit configured to send the first signature value to the second serial device and thus the second serial device authenticating the first signature value according to the first signature certificate and receiving a returned authenticating result; and a registration accomplishment determining module configured to confirm accomplishment of registering the first serial device in the second serial device after the first serial device passes authentication successfully.

Preferably, the connection establishing module comprises a request sending unit configured to send a detecting character and a request of setting device attribute information with a first baud rate after the first serial device is inserted in the second serial device; a detecting character sending unit configured to, if the first serial device does not receive a response returned by the second serial device, resend the detecting character with the first baud rate adjusted by the second serial device.

Preferably, the device attribute reporting module comprises a determining unit configured to receive the response and determine whether the response is permitting to set device attribute information; a first reporting unit configured to, if determining result of the determining unit is yes, report the device attribute information of the first serial device to the second serial device; a second reporting unit configured to, if determining result of the determining unit is no, send a command of identifying device type to the second serial device; and when receiving a request command of asking for device attribute information by the second serial device, report the device attribute information of the first serial device to the second serial device according to the request command.

Preferably, the authenticating module comprises a certificate obtaining unit configured to obtain a second signature certificate from the second serial device; a challenge code sending unit configured to send a second challenge code to the second serial device and thus the second serial device generating a second signature value according to the second challenge code and returning the second signature value to the first serial device; and an authenticating unit configured to authenticate the second signature value by using the second signature certificate and send successful authentication information to the second serial device after successful authentication.

According to the present invention, the first serial device reports device attribute information to the second serial device, initiates registering process on the second serial device, and provides authenticating information to the second serial device in registering process, so as to pass authentication of the second serial device successfully. The present invention solves problem of security vulnerability in registering of a registering device, which enhances security of registering process and extends functions of the serial device.

BRIEF DESCRIPTION OF THE ACCOMPANYING DRAWINGS

The accompanying drawings are included to provide a further understanding of the present invention and are incorporated in and constitute a part of this specification; the illustrated embodiments of the present invention, together with the description, serve to explain the principles of the present invention and are not be comprehended as constituting any limitation on the present invention. In the accompanying drawings.

DETAILED DESCRIPTION OF THE PRESENT INVENTION

The present invention will be described in detail hereinafter in conjunction with the drawings thereof and the embodiments. It should be noted that the embodiments in the present application and features of the embodiments can be combined with each other if there is no conflict.

Embodiment 1

The embodiment 1 provides a method for serial device registration, in which a first serial device and a second serial device are arranged. Herein, the first serial device is inserted into the second serial device; the first serial device is a slave device of the second serial device. In practical implement, the first serial device can be a smart key device or other information security devices; the second serial device can be a device, such as a mobile terminal, etc.; the second serial device supplies power to the first serial device when the first serial device is working.

Figure 1:
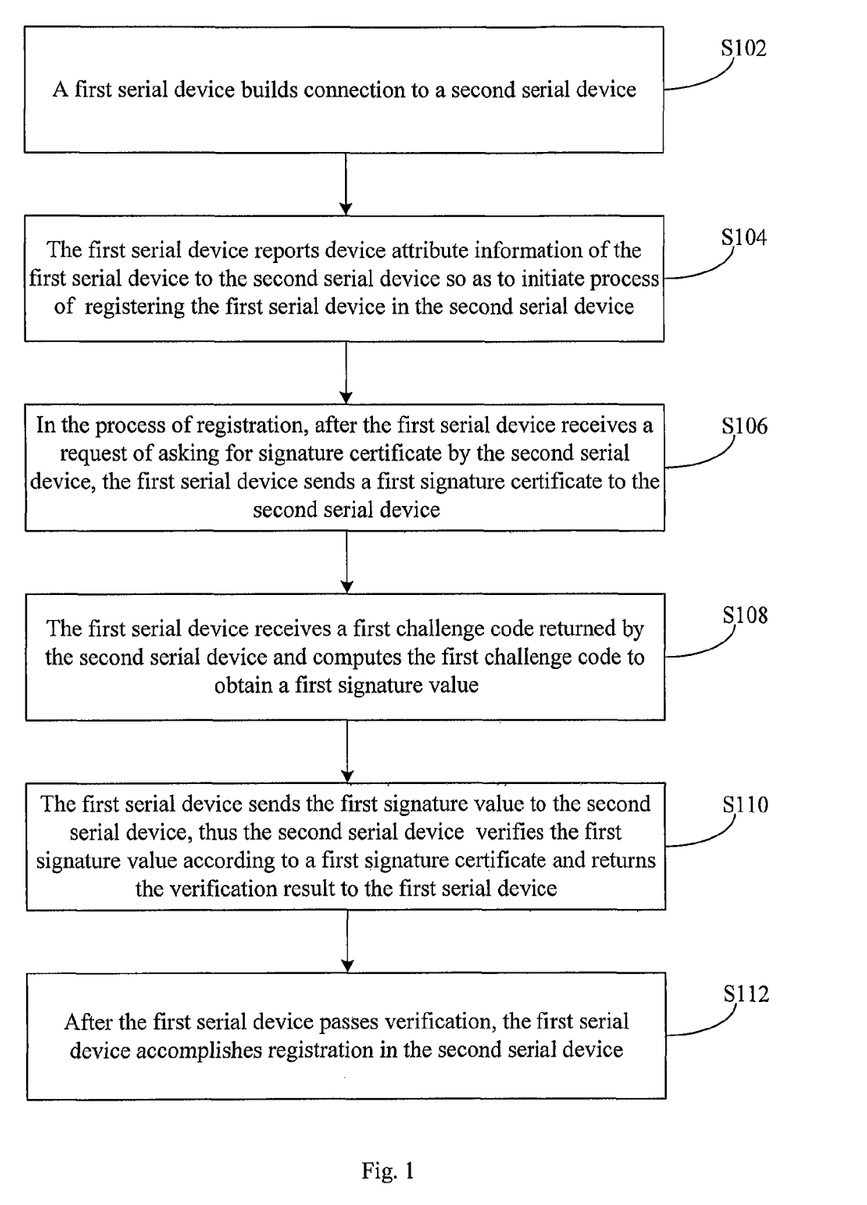
FIG. 1 is a flow chart of a method for registering a serial device of embodiment 1 according to the present invention.

FIG. 1 provides a flow chart of the method for serial device registration provided by the embodiment 1 and the method includes following steps.

Step S102, the first serial device establishes connection to the second serial device;

After the first serial device being inserted into the second serial device, the first serial device sends a detecting character and a request of setting device attribute information with a first baud rate; if the first serial device does not receive a response returned from the second serial device in a specified time, the first serial device will adjust the first baud rate and resend the detecting character to the second serial device with the adjusted first baud rate.

Step S104, the first serial device reports the device attribute information of the first serial device to the second serial device so as to initiate process of registering the first serial device in the second serial device;

After the first serial device receives the responding information, the first serial device determines whether the response is to permit to set the device attribute information, if yes, the first serial device reports the device attribute information of the first serial device to the second serial device; if no, the first serial device sends a device type identification command to the second serial device, and when the first serial device receives a request command of asking for device attribute information from the second serial device, the first serial device reports the device attribute information of the first serial device to the second serial device according to the request command.

Step S106, in the process of registration, after the first serial device receives the request of asking for signature certificate from the second serial device, the first serial device sends a first signature certificate to the second serial device;

Step S108, the first serial device receives a first challenge code returned from the second serial device and computes the first challenge code so as to obtain a first signature value;

Step S110, the first serial device sends the first signature value to the second serial device and thus the second serial device authenticates the first signature value according to the first signature certificate and returns authentication result to the first serial device;

The above steps S106 to S110 are about the second serial device authenticating the first serial device. Of course, in order to enhance security, the process of registration can further include a process that the first serial device authenticates the second serial device, which is specifically similar to the above authentication process and the authentication process is performed by signature certificate and signature value. For example, the authentication process can include that the first serial device obtains a second signature certificate from the second serial device; the first serial device sends a second challenge code to the second serial device and thus the second serial device generates a second signature value according to the second challenge code and returns the second signature value to the first serial device; the first serial device uses the second signature certificate to authenticate the second signature value; after the authentication is successful, the first serial device sends information of successful authentication to the second serial device.

Step S112, after the first serial device is authenticated successfully, the first serial device accomplishes its registration in the second serial device.

If the registration process further includes that the first serial device authenticates the second serial device and the first serial device determines that the second serial device is legitimate in step S112, thus determining that the registration is accomplished. If the authentication of the first serial device or the second serial device is failed, the device attribute information is reported to the second serial device again, which is used to initiate the process of registering the first serial device in the second serial device again.

In the embodiment 1, the registration process of the serial device specifically includes:

Step 1, the first serial device sends the detecting character to the second serial device with the first baud rate and, in a predetermined time, sends the request for setting device attribute to the second serial device;

Step 2, the first serial device determines whether the responding information returned by the second serial device is received; if yes, go to Step 3, if the second serial device does not return responding information, the first serial device adjusts the first baud rate and go back to Step 1;

Step 3, the first serial device determines whether the received responding information is permitting to set device attribute, if yes, the first serial device sends setting device attribute information, which is for triggering the process that the first serial device is registered in the second serial device, to the second serial device, then go to Step 4; otherwise, the first serial device sends the device type identification command to the second serial device and goes to Step 5;

Step 4, the first serial device determines whether receives the information of setting the device attribute information sent by the second serial device, if yes, go to Step 5, otherwise, requests for setting again and goes back to Step 1;

Step 5, the first serial device receives the first signature authentication performed by the second serial device;

Step 6, the first serial device determines whether a first authentication result returned by the second serial device is successful, if yes, go to Step 7, otherwise, the first serial device requests for setting device attribute and the authentication progress again and go back to Step 1;

Step 7, the first serial device performs a second signature authentication on the second serial device and sends the authentication result to the second serial device; if the authentication is successful, the two times of authentication is successful, the first serial device and the second serial device accomplishes the registration process; otherwise, the first serial device requests for setting device attribute and authentication process again and goes back to Step 1.

In the embodiment 1, the first serial device reports the device attribute information to the second serial device, triggers registration process performed on the second serial device, and provides authentication information to the second serial device, so as to pass the authentication of the second serial device and thus enhancing security of the registration process and expanding functions of the serial device.

Embodiment 2

The embodiment 2 provides a method for serial device registration, in which there are a first serial device and a second serial device. An authentication processing chip is built in the first serial device; the first serial device is inserted into the second serial device, and the second serial device supplies power to the first serial device when the first serial device is working.

In the embodiment 2, the method for the first serial device to combine data packet to be sent and receive data packet includes following steps.

The method for the first serial device to combine the data packet according to content to be sent, a current command ID and a current transmission ID specifically includes Step 2001, filling data packet header in and setting the current filling position to behind the packet header.

Specifically, in the embodiment 2, the header is a predetermined character string.

Specifically, the length of the predetermined character string is 2 bytes and its value is FF55. Correspondingly, the current filling position is obtained by shifting 2 bytes from starting position of the data packet.

Step 2002, filling field of content length.

In the embodiment 2, filling field of content length specifically includes

Step 2002-1, determining whether the length of the content to be sent overpasses 65535, if yes, reporting error and ending process; otherwise, determining whether the length overpasses 255, if yes, go to Step 2002-2; otherwise go to Step 2002-4;

Step 2002-2, writing 0 in the current filling position and shifting the current filling position with 1 byte;

Step 2002-3, writing length value in the current filling position and shifting the current filling position with 2 bytes and filling is accomplished;

Step 2003-4, filling length value in the current filling position and shifting 1 byte from the current filling position;

In the case that the length value does not overpass 255, 1 byte is enough for representing; in the case that the length value is between 255 to 65535, 2 bytes are needed. In the embodiment 2, when filling the length of 2 bytes, fill high byte of length value in and then fill low byte of length value in.

For example, the length value to be filled is 258 which is represented as 01 02 by hex, then in Step 2002-3, the filled data is 01 02.

Step 2003, filling in the current command ID and shifting the current filling position.

In the embodiment 2, the current command ID is predetermined. Specifically, the length of the current command ID is 2 bytes. Correspondingly, shift the current filling position with 2 bytes.

For example, the filled command ID is 00 38.

Step 2004, filling the current transmission ID in and shifting the current filling position.

In the embodiment 2, the initial value of the current transmission ID is predetermined. Specifically, the length of the transmission ID is 2 bytes. Preferably, initial value is 00 01. The transmission ID of subsequent command is increased by 1 on the basis of the initial value; correspondingly, shift the current filling position with 2 bytes. The transmission ID also can be a random number or other values which are different at each time.

Step 2005, filling the content to be sent in the current filling position; shifting the current filling position with corresponding length.

Step 2006, computing a check value according to the current filled content and filling the check value in the current filling position, thus accomplishing combining packet.

Specifically, in the embodiment 2, the method for computing the check value is:

Length field+command ID+transmission ID+content+
check value=0;

For example, the filled content is FF 55 04 00 38 00 01;
the check value obtained by computing is C3. Correspondingly, data packet which is obtained finally by combining is FF 55 00 01 02 3F 00 C3.

The first serial device parses the received data packet according to a predetermined method and the current command ID and the transmission ID; specifically, a method for extracting content is:

Step 2011, setting current scanning position to be the start of the data packet, scanning the packet and determining whether the value of the current scanning position matches a predetermined header, if yes, shifting the current scanning position; otherwise, reporting error and ending process;

Specifically, determining whether the value of the current scanning position matches the predetermined packet header includes Step 2011-1, determining whether the current scanning position overpasses the data packet length scope, if yes, reporting error and exiting; otherwise, going to Step 2011-2;

Step 2011-2, comparing whether data packet content, which is started from the current scanning position and of which the length is equal to the length of the predetermined value, is identical to the predetermined value, if yes, they are matched; otherwise, they are not matched.

Specifically, in the embodiment 2, the predetermined header is character string FF55 with 2 bytes. Correspondingly, if the value of the current scanning position matches the predetermined header, shift the current scanning position by 2 bytes.

Step 2012, determining whether the current scanning position is 0, if yes, taking the 2 bytes behind the current scanning position as the length of the content and shifting the current scanning position by 3 bytes; otherwise, taking the value of the current scanning position as the length of the content and shifting the current scanning position by 1 byte.

In the embodiment 2, taking the 2 bytes behind the current scanning position as the length of the content specifically is taking the first byte as high bit of the length value and taking the second byte as the low bit of the length value.

For example, the two bytes of data behind the current scanning position are 01 02 and the length value is 0x0102 (258).

Step 2013, determining whether the current scanning position overpasses the length scope of data packet, if yes, reporting error and exiting; otherwise, going to Step 2014;

Step 2014, determining whether the current scanning potion matches the current command ID, if yes, shifting the current scanning position, otherwise, reporting error and ending process.

The method of determining is identical to Step 2011 and no more detail is given here.

In the embodiment 2, the command ID is predetermined. Specifically, the length of the command ID is 2 bytes. Correspondingly, if they are matched, shift the current scanning position by 2 bytes.

Step 2015, determining whether the current scanning position matches the current transmission ID, if yes, shifting the current scanning position, otherwise, reporting error and ending process.

The method of determining is identical to Step 2011 and no more detail is given here.

In the present embodiment 2, the initial value of the transmission ID is predetermined. Specifically, the length of the transmission ID is 2 bytes. Correspondingly, if they are matched, shift the current scanning position by 2 bytes.

Step 2016, reading corresponding length of data from the current scanning position according to the length value and taking the data as the extracted content and ending process.

In the present embodiment 2, corresponding length specifically is difference obtained by that length value minus length of command ID and length of transmission ID.

In the present embodiment 2, Step 2016 further includes extracting a check code and verifying completeness of data packet, which specifically includes Step 2016-1, shifting the current scanning position according to the difference;

Step 2016-2, determining whether the current scanning position overpasses scope of data packet length, if yes, reporting error and exiting; otherwise, going to Step 2016-3;

Step 2016-3, taking the value of the current scanning position as the check code; verifying whether the data packet is completed, if no, reporting error and exiting; otherwise, going to Step 2016-4;

Specifically, determining whether the data packet is complete includes: length field+command ID+content+check value=0;

Step 2016-4, determining whether the current scanning position reaches edge of the data packet, if yes, accomplishing extracting; otherwise, reporting error and exiting.

Extracting the check code and verifying completeness of the data packet can be performed before Step 201; specifically, extracting the check code and verifying completeness of the data packet includes directly reading the last byte of the data packet and taking the last byte as the checking code and checking the completeness of the data packet according to the method of length field+command ID+content+check value=0.

Figure 2:
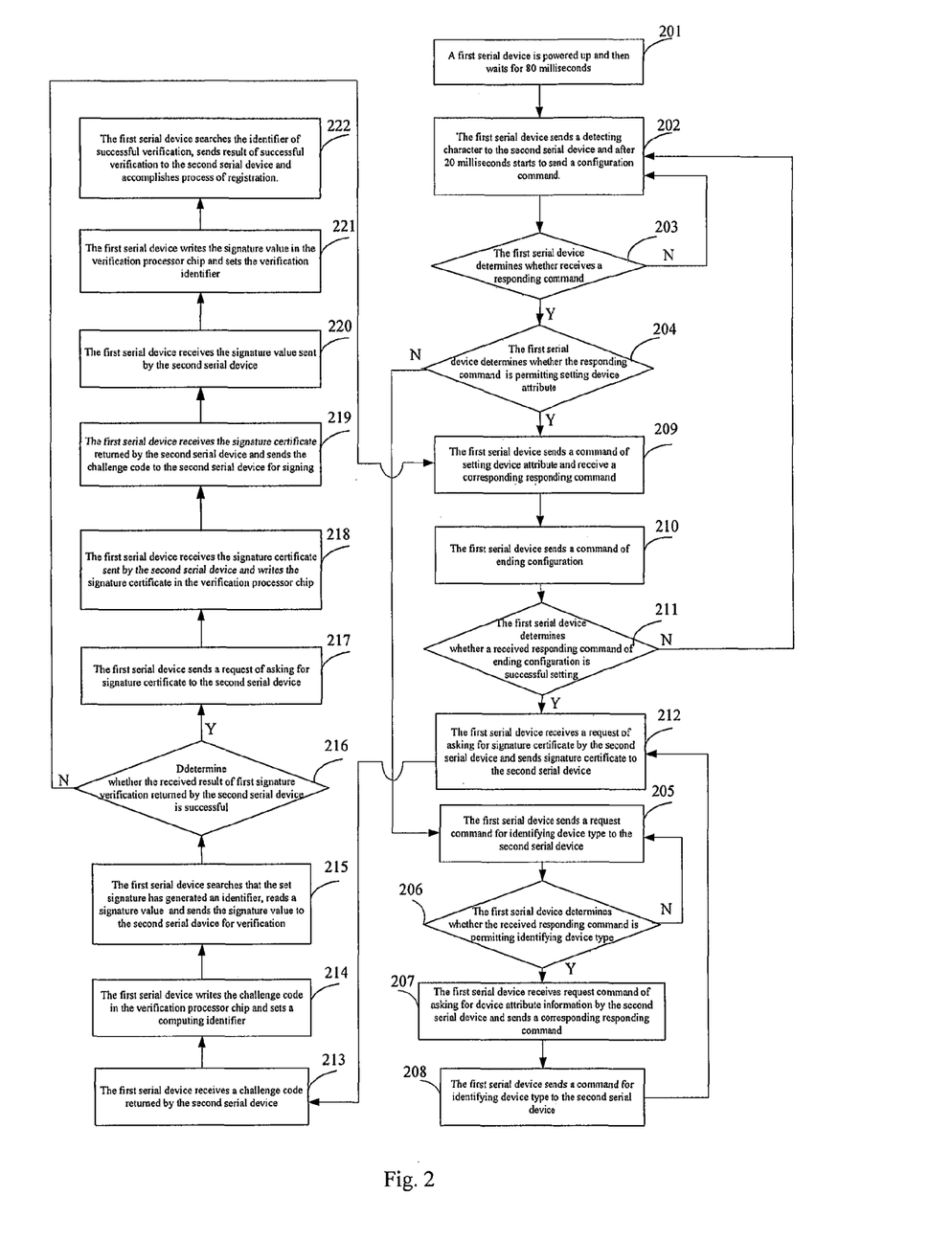
FIG. 2 is a flow chart of a method for registering a serial device of embodiment 2 according to the present invention.

Referring to the flow chart of method for registration of serial device of FIG. 2, the method specifically includes following steps:

Step 201, a first serial device is powered up and then waits for 80 milliseconds;

Step 202, the first serial device sends a detecting character to the second serial device with a first baud rate and, after 20 milliseconds, starts to send a configuration command to the second serial device.

The second serial device computes the rate for communicating with the first serial device according to the received detecting character; specifically, in Embodiment 2, the detecting character is 0xFF, the initial value of the first baud rate is 19200 bps and the self-adaptive range of the baud rate is from 9600 bps to 57600 bps.

Step 203, the first serial device determines whether receives a responding command returned from the second serial device in a predetermined time, if yes, go to Step 204, if the second serial device does not return the responding command, the first serial device adjusts the first baud rate and go back to Step 202;

Step 204, the first serial device determines whether the responding command returned from the second serial device is permitting to set device attribute, if yes, go to Step 209, otherwise, go to Step 205;

Specifically, in the embodiment 2, if the content extracted from the received message is a predetermined permitting setting device attribute command, go to Step 209, otherwise, go to Step 205.

Specifically, the predetermined permitting setting device attribute command is a character string 00 02 00 01 00 38 with six bytes; 00 38 is parsed to obtain that the second serial device support 38 command, which means permitting setting device attribute.

Step 205, the first serial device sends a request command of identifying device type to the second serial device;

Specifically, in the embodiment 2, the content of the request is a character string 00 00 00 01 00 00 00 00 00 00 00 00 with 12 bytes; correspondingly, the method for combining the data packet of the command of identifying device type according to the content to be sent, a current command ID 0013 and a current transmission ID by the first serial device is identical to the method above and no more detail is given here.

Step 206, the first serial device determines whether the received responding command returned by the second serial device is permitting identifying device type, if yes, go to Step 207, otherwise, go back to Step 205 and the first serial device resends the request command of identifying device type;

Specifically, in the embodiment 2, if the first serial device extracts 1 byte 00 from the received message, the second serial device permits identifying device type; otherwise, the first serial device resends the request command of identifying device type.

Step 207, the first serial device receives a request command of asking for device attribute information by the second serial device, the first serial device responds the request command and sends a corresponding responding command to the second serial device;

Specifically, in the embodiment 2, if the first serial device extracts content of predetermined one byte 00 from the received message, correspondingly, the first serial device sends content of predetermined responding command 00 00 00 F3 to the second serial device, which means that the first serial device supports sending device attribute information to the second serial device. The device attribute information is set according to the information of the first serial device. For example, if the first serial device extracts content of predetermined 1 byte 01 from the received message, correspondingly, the content sent to the second serial device by the first serial device is attribute information of device name; specifically, the device name is 46 54 43 61 72 64 52 65 61 64 65 72 00.

If the content extracted from the received message by the first serial device is predetermined 1 byte 04, correspondingly, the content sent to the second serial device by the first serial device is attribute information of device software version; specifically, the device software version is 01 00 00.

If the content extracted from the received message by the first serial device is predetermined 1 byte 05, correspondingly, the content sent to the second serial device by the first serial device is attribute information of device hardware version; specifically, the device hardware version is 01 00 00.

If the content extracted from the received message by the first serial device is predetermined 1 byte 06, correspondingly, the content sent to the second serial device by the first serial device is attribute information of device manufacturer name; specifically, the device manufacturer name is 46 54 73 61 66 65 00.

If the content extracted from the received message by the first serial device is predetermined 1 byte 07, correspondingly, the content sent to the second serial device by the first serial device is attribute information of device type; specifically, the device type is 52 4F 43 4B 45 59 35 30 31 00.

The five above device attribute commands are device attributes for which the second serial device must ask the first serial device. In addition, the second serial device may ask the first serial device for the following device attributes. For example, if the content extracted from the received message by the first serial device is predetermined 1 byte 08, correspondingly, the content sent to the second serial device by the first serial device is attribute information of device sequence number; specifically, the device sequence number is 35 36 37 00; and if the content extracted from the received message by the first serial device is predetermined 1 byte 09, correspondingly, the content sent to the second serial device by the first serial device is attribute information of maximum length of data packet supported by the device; specifically, the maximum length of the data packet is FF FF.

Step 208, the first serial device sends a command of identifying device type to the second serial device and go to step 212.

The content of the to-be-sent command of identifying device type is a predetermined character string with 12 bytes 00 00 00 01 00 00 00 0E 00 00 02 00.

Correspondingly, the method for combining the content to be sent, current command ID 0013 and current transmission ID by the first serial device is identical to the above method for combining data packet; no more detail is given here.

Step 209, the first serial device sends a serial of commands for setting device attribute to the second serial device; and the first serial device receives corresponding responding command of setting device attribute returned by the second serial device.

The commands of setting device attribute that the first serial device must send to the second serial device include following commands: command of setting device ID, command of setting device capability, command of setting device information, and command of setting device protocol string; commands of setting device information specifically include command of setting device name, command of setting device software version, command of setting device hardware version, command of setting device manufacturer name, command of setting device type, and command of setting radio frequency verification.

In the embodiment 2, the content of the to-be-sent command of setting device attribute is set according to own information of the first serial device; for example, the content of the command of setting device ID is a character string with 12 bytes 00 00 01 00 00 00 00 02 00 00 02 00.

The content of the command of setting device capability is a character string with 10 bytes 00 01 00 00 00 00 00 00 02 00.

The content of the command of setting device name is a character string with 16 bytes 00 02 01 46 54 43 61 72 64 52 65 61 64 65 72 00.

The content of the command of setting device software version is a character string with 6 bytes 00 02 04 01 00 00.

The content of the command of setting device hardware version is a character string with 6 bytes 00 02 05 01 00 00.

The content of the command of setting device manufacturer name is a character string with 10 bytes 00 02 06 46 54 73 61 66 65 00.

The content of the command of setting device type is a character string with 13 bytes 00 02 07 52 4F 43 4B 45 59 35 30 31 00.

The content of the command of setting device RF verification content is a character string with 7 bytes 00 0C 00 00 00 01.

The content of the command of setting device protocol character string with 12 bytes 00 04 01 63 6F 6D 2E 66 74 73 61 66 65 2E 6B 65 79 00.

Correspondingly, the method for combining data packet according to the content of command of setting device attribute, command ID and transmission ID is identical to the above method for combining data packet; no more detail is given here.

The commands of setting device attribute sent to the second serial device by the first serial device can further include other commands, for example, command of setting device sequence number and command of setting device applied character.

The content of command of setting device sequence number is a character string with 7 bytes 00 02 08 35 36 37 00.

The content of command of setting device applied character is a character string with 6 bytes 00 05 30 31 32 00.

Correspondingly, the method for combining data packet according to the content of setting the device attribute to be sent, command ID and transmission ID is identical to the above method for combining data packet; no more detail is given here.

In the embodiment 2, the sequence of sending the command of setting device attribute by the first device can be adjusted.

In Step 209 above, after the first serial device accomplishing sending a command of setting device attribute, the first serial device determines whether receives corresponding responding command, if yes, go on sending next command of sending device attribute, otherwise, report error and exit; the sequence of sending the command of setting device attribute by the first serial device can be adjusted; preferably, the transmission ID is increased by 1 orderly according to sequence of sending the command.

In the embodiment 2, if the content extracted from the received message is approving the command of setting device attribute, send next command of setting device attribute; otherwise, report error and exit.

Specifically, for example, the extracted content is a command of approving setting device ID; the command of approving setting device ID is a character string with 9 bytes 00 3A 00 02 01 03 00 00 00, the command of approving setting device ID of the second serial device is obtained by the last byte 00.

In above Step 209, another way of implementing sending command of setting device attribute by the first serial device is combining the command of setting device attribute command to be a data packet and sending the data packet to the second serial device, specifically, combining the command of setting device ID, the command of setting device capability, seven commands contained in the command of setting device information and content of setting device protocol character to be a whole content and filling the whole content into corresponding current position as a predetermined content of the data packet.

Correspondingly, the method of combining data packet by the first serial device according to content of command of setting device attribute to be sent, the current command ID and current transmission ID is identical to the above method of combining data packet; no more detail is given here.

Step 210, the first serial device sends a command of ending configuration to the second serial device.

Specifically, in the present embodiment 2, the command of ending configuration to be sent is predetermined 1 byte 00.

Correspondingly, the method of combining data packet by the first serial device according to content of to-be-sent command of ending configuration, the current command ID and current transmission ID is identical to the method of combining data packet; no more detail is given here.

Step 211, the first serial device determines a responding command of ending configuration sent by the second serial device, if the status shows successful setting, go to Step 212, otherwise, re-ask for setting and go back to Step 202;

Successful setting means that the second serial device approves all commands of setting device attribute of the first serial device; the second serial device opens corresponding functions according to the information of setting device attribute;

Specifically, in the embodiment 2, if the content extracted from the received message is the predetermined 1 byte 00, the setting is successful; otherwise, the setting is failed and re-ask for setting.

Step 212, the first serial device receives a request of asking for signature certificate by the second serial device, the first serial device reads signature certificate from a authentication processor chip and sends the signature certificate to the second serial device.

The first serial device parses received data packet of asking for the signature certificate according to a predetermined method, current command ID and transmission ID. The method for extracting content is identical to the above method of parsing packet; no more detail is given here.

In the embodiment 2, the way by which the first serial device sends signature certificate to the second serial device is sending by segments or combining a data packet. Sending by segments, for example, is sending by 8 segments. That is to say, 8 data packets are sent to the second serial device. Specifically, the content of the first to-be-sent data packet is version number 0200 of a predetermined signature certificate, sequence of the current data packet 00, the maximum sequence number 07 of the data packet and the first part content of the signature certificate; Specifically, fill 0200 in next position of the transmission ID position, correspondingly, shift the current filling position by 2 bytes; fill 00 in the current filling position; sequence number of the subsequent data packet is increased by 1 on the basis of 00, correspondingly, shift the current filling position by 1 byte; fill 07 in the current filling position, correspondingly, shift the current filling position by 1 byte; fill the first part of the signature certificate in the current filling position;

The method of combining data packet according to content of the first to-be-sent data packet, the current command ID and the current transmission ID is identical to the above method of combining data packet; no more detail is given here;

Correspondingly, if the content extracted from the received message is approving the first part of the signature certificate sent by the first serial device, the next data packet is sent; otherwise, report error and exit; specifically, in the embodiment 2, command of approving the first part of the signature certificate is a character string with 6 bytes 00

02 01 74 00 15; the last 0015 is parsed so as to obtain that the first part of the signature certificate is approved by the second serial device.

The method for combining 8 data packets by the first serial device according to the content of the signature certificate to be sent, current command ID and current transmission ID is identical to the above method for combining data packet; no more detail is given here; correspondingly, method for parsing the responding data packets, which are from the first data packet to the seventh data packet, returned by the second serial device is identical to the above method of parsing data packet; no more detail is given here.

In the embodiment 2, the first serial device parses the last responding data packet; if the content extracted from the received message is a command of determining that the sent signature certificate is valid, the second serial device generates a challenge code and go to Step 213; otherwise, the serial device resends the signature certificate; specifically, the content of command of determining that the signature certificate is valid is a character string with 5 bytes 00 16 01 7B 00; the second serial device determines that the signature certificate sent by the first serial device is valid by parsing the last byte 00.

Another implementing method for sending the signature certificate to the second serial device by the first serial device is that the first serial device combines the signature certificate to be one data packet and sends the data packet to the second serial device; specifically, the length value of the content of the data packet ranges from 255 to 65535; 2 bytes is for representing length value, which specifically is 03 B9 in the embodiment 2.

The method of combining data packet of signature certificate by the first serial device according to the content of the signature certificate to be sent, the current command ID, the transmission ID is identical to the above method of combining data packet; no more detail is given here; correspondingly, if the content extracted from the received data packet by the first serial device is a command of predetermined valid signature certificate, go to Step 213; otherwise, report error and exit; specifically, the content of command of valid signature certificate is a character string with 5 bytes 00 16 01 6D 00.

Step 213, the first serial device receives a challenge code sent by the second serial device; and the challenge code is a random number generated by the second serial device.

In the embodiment 2, the method for extracting challenge code from the received message is identical to the above method for extracting corresponding content; for example, the extracted challenge code is 29 AD C5 9F B5 30 AF 10 75 29 F1 AC 4D BB EC D6 93 68 11 DD; correspondingly, shift the current scanning position according to the length of challenge code; extract the value of the current scanning position; the times of repeating authentication of the first serial device supported by the second serial device is 1.

Step 214, the first serial device writes the challenge code in the authentication processor chip; the first serial device sets a computing identifier.

Step 215, the first serial device searches that the set signature has generated an identifier, reads a signature value from the authentication processor chip and sends the signature value to the second serial device; and the authentication processor chip searches the generated computing identifier set by the first serial device; the authentication processor chip computes the signature value and set the identifier generated by the signature.

Specifically, in the embodiment 2, the content to be sent is a signature value; the method for combining the data packet of the signature value by the first serial device is identical to the above method for combining data packet; no more detail is given here.

Step 216, the first serial device determines whether the received first signature authentication result sent by the second serial device is successful, if yes, go to Step 217; otherwise, the authentication is failed and re-asks for authentication; go back to Step 209.

The first signature authentication is that the second serial device authenticates the signature value sent by the first serial device according to the signature certificate sent by the first serial device; specifically, in the embodiment 2, if the content extracted from the received message is command of successful authentication of the first signature, go to Step 217; otherwise, the authentication is failed, re-ask for authentication and go back to Step 209.

Specifically, the content of command of successful authentication of the first signature is a character string with 5 bytes 00 19 01 7B 00; successful authentication of the first signature is obtained by parsing the last byte 00.

Step 217, the first serial device sends a request of asking for signature certificate to the second serial device and waits for the signature certificate sent by the second serial device; and the method for combining the data packet according to the content of asking for the content of the to-be-sent signature certificate, the current command ID and the current transmission ID is identical to the above method for combining data packet; no more detail is given here.

Step 218, the first serial device receives the signature certificate sent by the second serial device and writes the signature certificate in the authentication processor chip.

The first serial device parses the received data packet of the signature certification according to a predetermined method, the current command ID and the transmission ID; the method for extracting signature certificate is identical to the above method for extracting corresponding content; no more detail is given here.

Step 219, the first serial device reads a challenge code from the authentication processor chip and sends the challenge code to the second serial device.

The authentication processor chip authenticates whether the signature certificate sent by the second serial device is valid, if yes, the first serial device generates the challenge code and sends the command of valid signature certificate to the second serial device; otherwise, go back to Step 209.

Specifically, in the embodiment 2, the content of the command of valid signature certificate sent by the first serial device is the predetermined 1 byte 00.

The above challenge code is a random number generated by the authentication processor chip. Specifically, in the embodiment 2, fill the challenge code generated by the authentication processor chip in the next position of the current transmission ID position; correspondingly, shift the current scanning position by corresponding length according to the length of the challenge code; fill 1 byte 01 in the current filling position, which means that the times supported by the first serial device for repeating authentication of the second serial device is 1.

The method for combining data packet by the first serial device according to the challenge code to be sent, the current command ID and the current transmission ID is identical to the method for combining data packet; no more detail is given here.

Step 220, the first serial device receives the signature value sent by the second serial device; and the second serial device uses a stored signature private key to calculate out the signature value according to the challenge code.

In the embodiment 2, the first serial device parses the obtained data packet of the signature value according to the predetermined method, the current command ID and the transmission ID; the method for extracting the signature value is identical to the above method for extracting corresponding content; no more detail is given here.

Step 221, the first serial device writes the signature value in the authentication processor chip; the first serial device sets the authentication identifier.

Step 222, the first serial device searches a successful authentication identifier set by the authentication processor chip and sends result of successful verification to the second serial device; the first serial device and the second serial device authenticates twice successfully; the first serial device accomplishes registration in the second serial device and the two devices can start to communicate with each other.

The authentication processor chip searches the verification identifier set by the first serial device and authenticates the second signature according to the signature certificate sent by the second serial device. If the authentication is successful, set the successful authentication identifier; while if the authentication is failed, go back to Step 209 and re-ask for authentication.

Specifically, in the embodiment 2, the content to be sent is the predetermined 1 byte 00 of the successful second signature authentication;

The method for combining the data packet by the first serial device according to the to-be-sent content of the successful second signature, the current command ID and the current transmission ID is identical to the above method for combining data packet; no more detail is given here.

Embodiment 3

Figure 3:
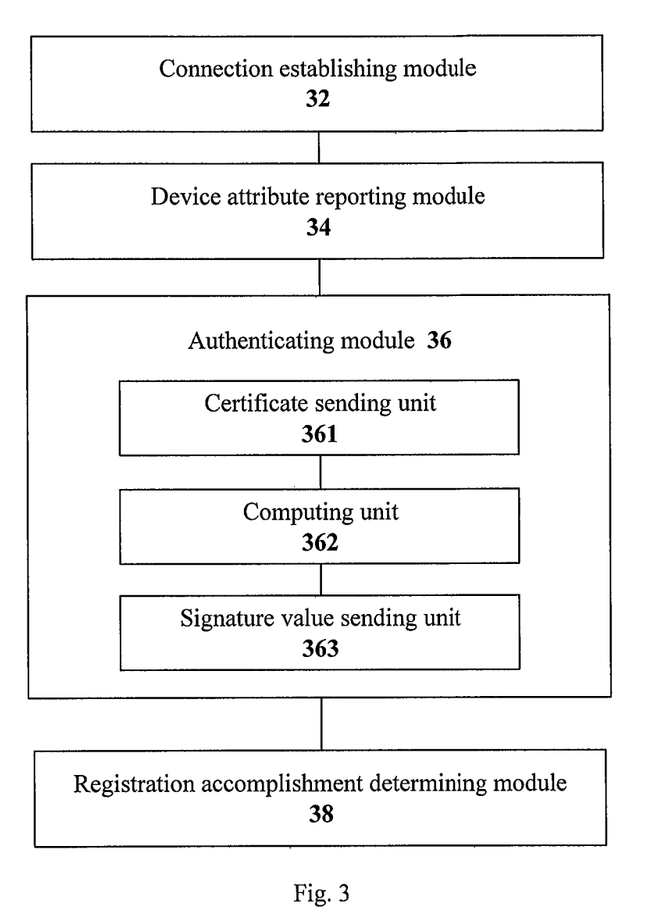
FIG. 3 is a structural diagram of serial device registration of embodiment 3 according to the present invention.

The embodiment 3 provides an apparatus for registration among serial devices. As shown by FIG. 3, the apparatus is set on a first serial device. The apparatus includes following modules:

a connection establishing module 32 configured to establish connection to a second device;

a device attribute reporting module 34, connecting to the establishing module 32, configured to report device attribute information of the first serial device to the second serial device and initiate process of registering the first serial device in the second serial device;

an authenticating module 36, connecting to the a device attribute reporting module 34, configured to receive authentication by the first serial device in the registration process; in the embodiment, the authenticating module 36 includes a certificate sending unit 361 configured to send a first signature certificate to the second serial device after receiving a request of asking for signature certificate by the second serial device; a computing unit 362 configured to receive a first challenge code returned by the second serial device and compute the first challenge code to obtain a first signature value; a signature value sending unit 363 configured to send the first signature value to the second serial device and thus the second serial device authenticates the first signature value according to the first signature certificate and receives returned authentication result; and a registration accomplishment determining module 38, connecting to the authenticating module 36, configured to confirm accomplishment of registering the first serial device in the second serial device after the first serial device passes authentication successfully.

Herein, the above connection building module 32 includes a request sending module configured to send a detecting character and a request of setting device attribute information to the second serial device with a first baud rate after the first serial device is inserted into the second serial device; and a detecting character sending unit configured to, if the first serial device does not receive responding information returned from the second serial device in a predetermined time, adjust the first baud rate by the first serial device and resend the detecting character to the second serial device with the adjusted baud rate.

The above device attribute reporting module 34 includes a determining unit configured to receive responding information and determine whether the responding information is permitting setting device attribute information; a first reporting unit configured to report the device attribute information of the first serial device to the second serial device if the result of the determining unit is yes; a second reporting unit configured to report a device type identification command to the second serial device if the result of the determining unit is no and report the device attribute information of the first serial device to the second serial device according to the request command when a command of asking for device attribute information of the second serial device.

Preferably, the authenticating module 36 includes a certificate obtaining unit configured to obtain a second signature certificate from the second serial device; a challenge code sending unit configured to send a second challenge code to the second serial device and thus the second serial device generates a second signature value according to the second challenge code and return the second signature value to the first serial device; an authenticating unit configured to authenticate the second signature value by using the second signature certificate and send information of successful authentication to the second serial device after the authentication is successful.

Figure 4:
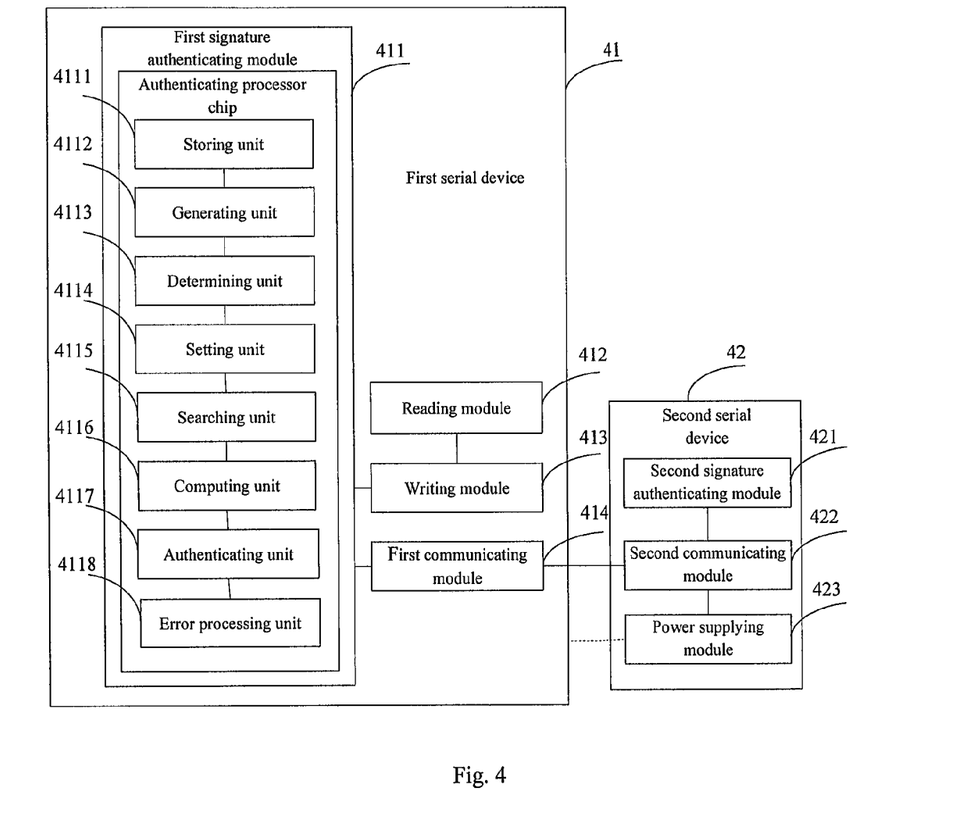
FIG. 4 is a systematic structural diagram of serial device registration of embodiment 3 according to the present invention.

FIG. 4 shows a specific structural diagram of a system of serial device registration provided by embodiment 3 of the present invention. Specifically, the system includes a first serial device 41 and a second serial device 42, in which the first serial device 41 specifically includes a first signature authenticating module 411, a reading module 412, a writing module 413 and a first communicating module 414;

the first signature authenticating module 411 specifically is an authentication processor chip which is configured to accept the first signature authentication performed on the first serial device 42 by the first serial device 41;

the authentication processor chip, which is the first signature authenticating module 411 specifically includes a storing unit 4111, a generating unit 4112, a determining unit 4113, a setting unit 4114, a searching unit 4115, a computing unit 4116, an authenticating unit 4117 and an error processing unit 4118;

the storing unit 4111 is configured to store private key, signature certificate and signature value of the first serial device 41 by the authenticating processor chip; further store the signature certificate and the signature value sent by the second serial device 42;

the generating unit 4112 is configured to authenticate the challenge code generated by the authentication processor chip;

the determining unit 4113 is configured to determine whether a responding command of starting configuration returned by the second serial device is permitting setting device attribute, determine whether a responding command of ending configuration returned by the second serial device is set successfully, determine whether the second serial device permits the first serial device to identify device type, and further determine whether the first signature authentication result returned by the second serial device is authenticated successfully;

the setting module 4114 is configured to set an computing identifier and an authenticating identifier by the first serial device 41 and further authenticate an identifier and a successful authentication identifier which are generated by the signature and set by the authentication processor chip;

the searching module 4115 is configured to search a set computing identifier and an authenticating identifier by the authentication process chip and further search the generated identifier and the successful authentication identifier of the set signature by the first serial device 41;

the computing unit 4116 is configured to, by the authentication processor chip, use the stored private key to obtain the signature value according to the challenge code sent by the second serial device 42;

the authenticating unit 4117 is configured to authenticate the signature value sent by the second serial device 42 by the authentication processor chip via the signature certificate sent by the second serial device 42;

the error processing unit 4118 is configured to, by the authentication processor chip, process the situation that the second serial device does not return the responding information of permitting setting the device attribute and further process the situation of failed set of the first serial device and further is configured to process situation of failed authentication.

the reading module 412 is configured to, by the first serial device 41, read the stored signature certificate, the generated challenge code and the signature value obtained by computing from the authentication processor chip;

the writing module 413 is configured to, by the first serial device 41, write the signature certificate, the challenge code and the signature value which are sent by the second serial device 42 in the authentication processor chip;

the first communicating module 414 is configured to send and receive information between the first serial device 41 and the second serial device 42;

the information specifically includes the detecting character, the responding information, the setting device attribute command, the responding command of the setting device attribute command, the signature certificate, the challenge code, the signature value and the authenticating result, etc.;

the second serial device 42 specifically includes a second signature authenticating module 421, a second communicating module 422 and a power supplying module 423;

the second signature authenticating module 421 is configured to perform second signature authentication on the second serial device 42 by the first serial device 41;

the second communicating module 422 is configured to send and receive information between the second serial device 42 and the first serial device 41;

the information specifically includes the detecting character, the responding information, the setting device attribute command, the responding command of the setting device attribute command, the signature certificate, the challenge code, the signature value and the authenticating result, etc.; and the power supply module 423 is configured to supply power to the first serial device 41 for the working time after the first serial device 41 is inserted into the second serial device 42.

In the embodiment 3, the first serial device reports device attribute information to the second serial device by the first serial device, triggers registration process performed on the second serial device and provides authentication information to the second serial device in registration process thus passing the authentication of the second serial device. Therefore, the security of the registration process is enhanced and functions of the serial devices are extended.

From what is described above, the first serial device in the above embodiments 1-3 reports device attribute information to the second serial device, triggers the registration process performed on the second serial device and provides authentication information to the second serial device and thus solving the security vulnerability in the registration among the serial devices by the authentication of the second serial device, enhancing the security of the registration process, and extending functions of serial devices. The communication based on the registration becomes safer.

Obviously, those skilled in the art should understand that the modules and steps described above can be implemented by a common computer device; the modules or steps can be integrated on a single computing device or distributed on a network composed of a plurality of computing devices; optionally, the modules or steps can be implemented by a programming code executable by a computing device, thus they can be stored in a storage device to execute by a computing device, or manufactured into individual integrated circuit module respectively, or several of them can be manufactured into a single integrated circuit module to realize; in this way, the disclosure is not limited to any combination of specific hardware and software.

The above are only the preferred embodiments 1-3 of the disclosure and not intended to limit the disclosure. For those skilled in the art, various modifications and changes can be made to the disclosure. Any modification, equivalent substitute and improvement within the spirit and principle of the present disclosure are deemed to be included within the scope of the disclosure.

The invention claimed is:

1. A method for registering a serial device, comprising steps of
   a first serial device establishing connection to a second serial device;
   the first serial device reporting device attribute information of the first serial device to the second serial device, and thus initiating a process of registering the first serial device in the second serial device;
   in the process of registering, the first serial device sending a first signature certificate after the first serial device receives a request of asking for signature certificate from the second serial device;
   the first serial device receiving a first challenge code returned from the second serial device and computing the first challenge code to obtain a first signature value;
   the first serial device sending the first signature value to the second serial device, and thus the second serial device authenticating the first signature value according to the first signature certificate and returning an authentication result to the first serial device; and
   the first serial device accomplishing registering in the second serial device after the first serial device passing authentication successfully; the said method further comprises the first serial device authenticating the second serial device, wherein
   the first serial device obtaining a second signature certificate from the second serial device;

the first serial device sending a second challenge code to the second serial device, and thus the second serial device generating a second signature value according to the second challenge code and returning the second signature value to the first serial device; and the first serial device using the second signature certificate to authenticate the second signature value; and after passing authentication successfully, the first serial device sending information of successful authentication to the second serial device.

2. The method of claim 1, wherein the first serial device establishing connection to the second serial device comprises the first serial device sending a detecting character and a request of setting device attribute information to the second serial device with a first baud rate after the first serial device is inserted into the second serial device; and the first serial device adjusting the first baud rate and resending the detecting character to the second serial device with the adjusted first baud rate if the first serial device does not receive a response returned from the second serial device within a specified time period.

3. The method of claim 2, wherein the first serial device reporting device attribute information of the first serial device to the second serial device comprises the first serial device receiving the response and determining whether the response is permitting to set the device attribute information;

if yes, the first serial device reporting the device attribute information of the first serial device to the second serial device; and if no, the first serial device sending a command of identifying device type to the second serial device; and the first serial device reporting the device attribute information of the first serial device to the second serial device according to a request command after receiving the request command of asking for the device attribute information from the second serial device.

4. The method of claim 3, wherein if the response is permitting to set the device attribute information, the first serial device reporting the device attribute information to the second serial device is implemented by setting such device attribute commands as a command of setting device identifier (ID), a command of setting device capability, a command of setting device information, and a command of setting device protocol character string;

wherein the command of setting device information comprises a command of setting device name, a command of setting device software version, a command of setting device hardware version, a command of setting device manufacturer name, a command of setting device type and a command of setting device radio frequency authentication.

5. The method of claim 4, wherein the command of setting the device attribute information further comprises a command of setting device sequence number and/or a command of setting device applied character string.

6. The method of claim 3, wherein if the response is not permitting to set the device attribute information, the device attribute information reported by the first serial device according to the request command comprises the device name, the device software version attribute information, the device hardware version attribute information, the device manufacturer name attribute information, and the device type attribute information of the first serial device.

7. The method of claim 6, wherein the device attribute information further comprises device sequence number attribute information and/or maximum length of a data packet supported by the device of the first serial device.

8. The method of claim 1, wherein if the authentication result of the first serial device or the second serial device is fail, the method further comprises the first serial device re-reporting the device attribute information to the second serial device, and re-initiating registering process till successful authentication.

* * * * *